(12) United States Patent
Nakamura

(10) Patent No.: US 6,612,517 B1
(45) Date of Patent: Sep. 2, 2003

(54) TAPE-LIKE MEDIUM RUNNING DEVICE

(75) Inventor: Kenjiro Nakamura, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/489,651

(22) Filed: Jan. 24, 2000

(30) Foreign Application Priority Data

Jan. 25, 1999 (JP) .......................................... 11-015595

(51) Int. Cl.⁷ .............................................. B65H 59/38
(52) U.S. Cl. .................................................... 242/413
(58) Field of Search .............................. 242/413, 413.5, 242/413.6, 413.3, 413.4, 417.3, 418.1, 334, 334.1, 333.5, 334.6, 334.5, 334.4, 334.3, 334.2

(56) References Cited

U.S. PATENT DOCUMENTS

| | | | | |
|---|---|---|---|---|
| 4,394,994 A | * | 7/1983 | Oono ....................... | 242/334.2 |
| 4,516,740 A | * | 5/1985 | Yoshino et al. .......... | 242/334.5 |
| 4,561,608 A | * | 12/1985 | O'Gwynn et al. ........ | 242/333.5 |
| 4,786,992 A | * | 11/1988 | Tajima et al. ............ | 242/334.4 |
| 4,977,466 A | * | 12/1990 | Nakata ..................... | 242/334.3 |
| 5,060,881 A | * | 10/1991 | Bogucki-Land .......... | 242/413.1 |
| 5,465,918 A | * | 11/1995 | Watanabe ................. | 242/334.2 |
| 5,626,304 A | * | 5/1997 | Mukai ...................... | 242/334.6 |
| 5,803,387 A | * | 9/1998 | Mace ....................... | 242/334.4 |
| 5,839,683 A | * | 11/1998 | Kijima et al. ............ | 242/334.2 |
| 6,315,229 B1 | * | 11/2001 | Miyahara ................. | 242/334.1 |

* cited by examiner

Primary Examiner—William A. Rivera
(74) Attorney, Agent, or Firm—RatnerPrestia

(57) ABSTRACT

A tape-like medium running device realizes a reduction of a fast-forwarding time and a rewinding time by running a tape-like medium at a high speed up to a marginal point near a leading end or a tail end of the tape-like medium during a fast-forward and a rewind operation. For this purpose, rotating speed of a motor is gradually slowed down with the lapse of time from a high target speed and then settled at a low target speed, if an irregularity detection unit determines there is an irregular condition based on an output of a wound-up diameter detector. The invention can thus allows a setting of a wound-up diameter comparison reference value at the marginal point near the leading end when rewinding (or, the marginal point near the tail end when fast-forwarding), and minimize a time during which the motor rotates at the low target speed.

5 Claims, 5 Drawing Sheets

TAPE-LIKE MEDIUM RUNNING DEVICE

FIELD OF THE INVENTION

The present invention relates to a tape-like medium running device installed in a magnetic recording and reproducing device such as a video cassette recorder utilizing a tape-like recording medium, for moving the tape-like recording medium at a high speed.

BACKGROUND OF THE INVENTION

Use of discs has been spreading widely in recent years as recording and reproducing media having a feature of quick access. On the other hand, there is a demand on magnetic tapes having slower access speed as compared to the discs, for reduction in running time of high-speed search and high-speed rewinding by increasing rotating speed of motors, thereby enhancing usability.

Japanese Patent Laid-open Publication, Number H02-49256 discloses one of tape-like medium running devices known previously. A tape-like medium running device of the prior art will be described hereinafter by referring to the accompanying figures. FIG. 4 is a block diagram depicting an architecture of the tape-like medium running device of the prior art.

The tape-like medium running device (hereinafter simply referred to as "TMRD") of the prior art comprises:

a) a motor 1 for moving a tape;

b) a take-up side reel 2, whereto rotation of the motor 1 is transferred via a belt and/or a gear, and whereon one end of a tape-like medium is wound, for moving the tape-like medium by rotation;

c) a supply side reel 3, whereon the other end of the tape-like medium is wound, for supplying the tape-like medium to the take-up side reel 2, of which rotation causes the tape-like medium to run;

d) a rotation detector 4 having an MR element, which outputs a frequency signal by detecting polarities (an N pole and an S pole) magnetized at regular intervals through a perimeter of the motor 1, for outputting the signal in frequency proportional to a rotating speed of the motor 1;

e) a wound-up diameter detector 5 for outputting a signal corresponding to a wound-up diameter in response to a number of rotations of the take-up side reel 2 and the supply side reel 3;

f) a target speed calculator 6 for a high speed (hereinafter simply referred to as "high-speed calculator") for producing an output of a target speed in order to bring a rotating speed of the motor 1 up to a first speed;

g) a target speed calculator 7 for a low speed (hereinafter simply referred to as "low-speed calculator") for producing an output of another target speed in order to slow down the rotating speed of the motor 1 gradually with the lapse of time from the first speed, and bringing it down to a second speed in the end;

h) a wound-up diameter comparator 8 for comparing an output of the wound-up diameter detector 5 with a wound-up diameter comparison reference value pre-established internally, and for outputting a result;

i) a target speed setting unit (hereinafter simply referred to as "target setting unit") 9 for comparing a wound-up diameter of the tape-like medium wound around the take-up side reel 2, which is detected by the wound-up diameter detector 5, with the wound-up diameter comparison reference value, and for establishing a rotating speed of the motor 1;

j) a speed controller 10 for outputting a rotation dictating signal in order to carry out a speed control in a manner to bring an output of the rotation detector 4 closer to a target speed output by the target setting unit 9; and k) a driving unit 11 for rotating the motor 1 in response to the rotation dictating signal output by the speed controller 10.

The target setting unit 9 carries out functions of:

detecting a wound-up diameter of the tape-like medium wound around the take-up side reel 2 with the wound-up diameter detector 5, and comparing it with the wound-up diameter comparison reference value; and setting a target speed in order to make the motor 1 to rotate at the first speed, if the output of the wound-up diameter detector 5 is not greater than the wound-up diameter comparison reference value; and setting another target speed in order to slow down the rotating speed of the motor 1 gradually with the lapse of time from the first speed, and to rotate it finally at the second speed, if the output of the wound-up diameter detector 5 is greater than the wound-up diameter comparison reference value.

In this instance, the take-upside reel 2 and the supply side reel 3 are reversed of their functions in the case of fast-forwarding as opposed to rewinding.

The TMRD of the prior art constructed as above operates in a manner, which will be described hereinafter by referring to the accompanying figure. When the TMRD starts fast-forwarding and rewinding, it controls the motor 1 to rotate at a high speed corresponding to the first speed in response to an output of the high-speed calculator 6 in order to take up the tape-like medium at high speed. The TMRD detects a wound-up diameter of the tape-like medium being wound around the take-up side reel 2 with the wound-up diameter detector 5 in order to avoid the tape-like medium from being damaged when the fast-forwarding is continued at the same high speed up to a tail end (or, a leading end in the case of rewinding). The TMRD detects that the tail end is coming closer (or, the leading end is coming closer, in the case of rewinding), if the wound-up diameter becomes greater than the wound-up diameter comparison reference value. This detection causes the target setting unit 9 to switch the target speed into an output of the low-speed calculator 7. The TMRD controls the motor 1 in a manner to reduce the rotating speed gradually with the lapse of time from the first speed to the second speed in the end, by switching the output.

The foregoing operation will be described in more detail by referring to FIG. 5. In FIG. 5, the axis of ordinates and the axis of abscissas respectively represent rotating speed of the motor 1 and lapse of time T during a reduction in speed of the motor 1. The target speed for a low speed (second speed) is represented by an alphabetic symbol Va, and the target speed for a high speed (first speed) is represented by an alphabetic symbol Vb. FIG. 5 is a characteristic chart showing a slowdown of rotating speed of the motor 1 near the tail end during fast-forwarding (or, near the leading end during rewinding). The conventional slowdown characteristic near the tail end during fast-forwarding (or, near the leading end during rewinding) is shown by a chain line 202. A point marked by a reference numeral 204 indicates a starting point of the speed reduction that the TMRD of the prior art commences based on the wound-up diameter comparison reference value. As the slowdown characteristic curve 202 shows, a period of time it takes until the tape-like medium reaches the leading end or the tail end after the rotating speed of the motor 1 has reached the low target speed Va (second speed), represented by an alphabetic symbol Tsp, is especially long. This time Tsp has been the primary reason that the fast-forward time and the rewinding time are not reducible.

As described above, the structure of the prior art has had the following problem.

At a point of time when the wound-up diameter of the tape-like medium becomes greater than the wound-up diameter comparison reference value, the rotating speed of the motor 1 is reduced gradually, as time goes by, from the first speed, and it is eventually brought down to the second speed. There is still a good length of the tape-like medium remaining on the supply side reel, which is an opposite end of the tape-like medium being wound, at this point of time.

Accordingly, it takes a long time for the motor 1 to rotate at the target speed Va of low-speed, or the second speed. It appears as if the problem can be solved simply by increasing a level of the wound-up diameter comparison reference value. However, an increase in level of the wound-up diameter comparison reference value actually means that it sets the starting point 204 of the speed reduction (hereinafter referred to as "speed reduction starting point"), from which the TMRD gradually reduces the speed from the first speed to the second speed, toward a marginal point near the leading end when rewinding (or, another marginal point near the tail end when fast-forwarding). The wound-up diameter detector 5 produces an error in its output, however, if a subtle variation occurs in the speed of the tape due to a variation of load, etc. As a result, the TMRD delays detecting the speed reduction starting point. This causes the tape to run up to the leading end during rewinding (or, the tail end during fast-forwarding) without attaining a reduction to the second speed, and damages the tape.

Therefore, the method of the prior art has been required to establish the wound-up diameter comparison reference value at a level in which a sufficient length of the tape-like medium remains on the supply side reel. Because of this setting, the method of the prior art starts decreasing the speed somewhat earlier, as shown by the speed reduction starting point 204, thereby prolonging the time to rotate the motor at the target speed Va of low speed, which is the second speed. This prevents the rewinding time and the fast-forwarding time from being shortened, and poses a problem in respect of usability.

SUMMARY OF THE INVENTION

The present invention is intended to solve the above problem, and it aims at providing a tape-like medium running devices ("TMRD") made to be easier to use by reducing the time required for the motor 1 to rotate at the second target speed Va for a low speed to a minimum, and shortening a time needed for rewinding, fast-forwarding and the like.

In order to achieve the above object, the TMRD of the present invention comprises:

a) a motor;
b) a rotation detector for detecting a signal in frequency proportional to a rotating speed of the motor;
c) a take-up side reel, whereon one end of a tape-like medium is wound, and which rotates in synchronized motion with rotation of the motor;
d) a supply side reel, whereon the other end of the tape-like medium is wound;
e) a wound-up diameter detector for detecting a diameter of the tape-like medium wound on the take-up side reel;
f) a target speed calculator for a high speed for outputting a target speed in order to bring up rotating speed of the motor to a first speed;
g) a target speed calculator for a low speed for outputting a target speed in order to slow down the rotating speed of the motor gradually with the lapse of time from the first speed, and bringing it down to a second speed in the end;
h) a wound-up diameter comparator for comparing an output of the wound-up diameter detector with a wound-up diameter comparison reference value pre-established internally;
i) an irregularity detector for detecting an irregular condition based on an output of the wound-up diameter detector;
j) a target speed setting unit for selecting an output of the target speed calculator for a high speed based on an output of the irregularity detector;
k) a speed controller for outputting a rotation dictating signal base on an output of the rotation detector and an output of the target speed setting unit; and
l) a driving unit for driving the motor to rotate according to the rotation dictating signal.

The target speed setting unit carries out functions of:

setting an output of the target speed calculator for a low speed, if an output of the irregularity detector indicates an irregular condition, or if an output of the wound-up diameter comparator indicates that an output of the wound-up diameter detector is greater than the wound-up diameter comparison reference value; and setting an output of the target speed calculator for a high speed in all cases other than the above.

With the foregoing architecture, the TMRD is able to shorten a running time required for rewinding, fast-forwarding and so on. Furthermore, the TMRD can prevent the tape from being damaged due to the tape being run up to a tail end or a leading end while rotating at a high speed, since it reduces the rotating speed of the motor, if a detected result of wound-up diameter is in error.

DETAILED DESCRIPTION OF THE PREFERRED EMBODIMENT

An exemplary embodiment of a tape-like medium running device ("TMRD") of the present invention will be described hereinafter by referring to the accompanying figures.

First Exemplary Embodiment

Figure 1:
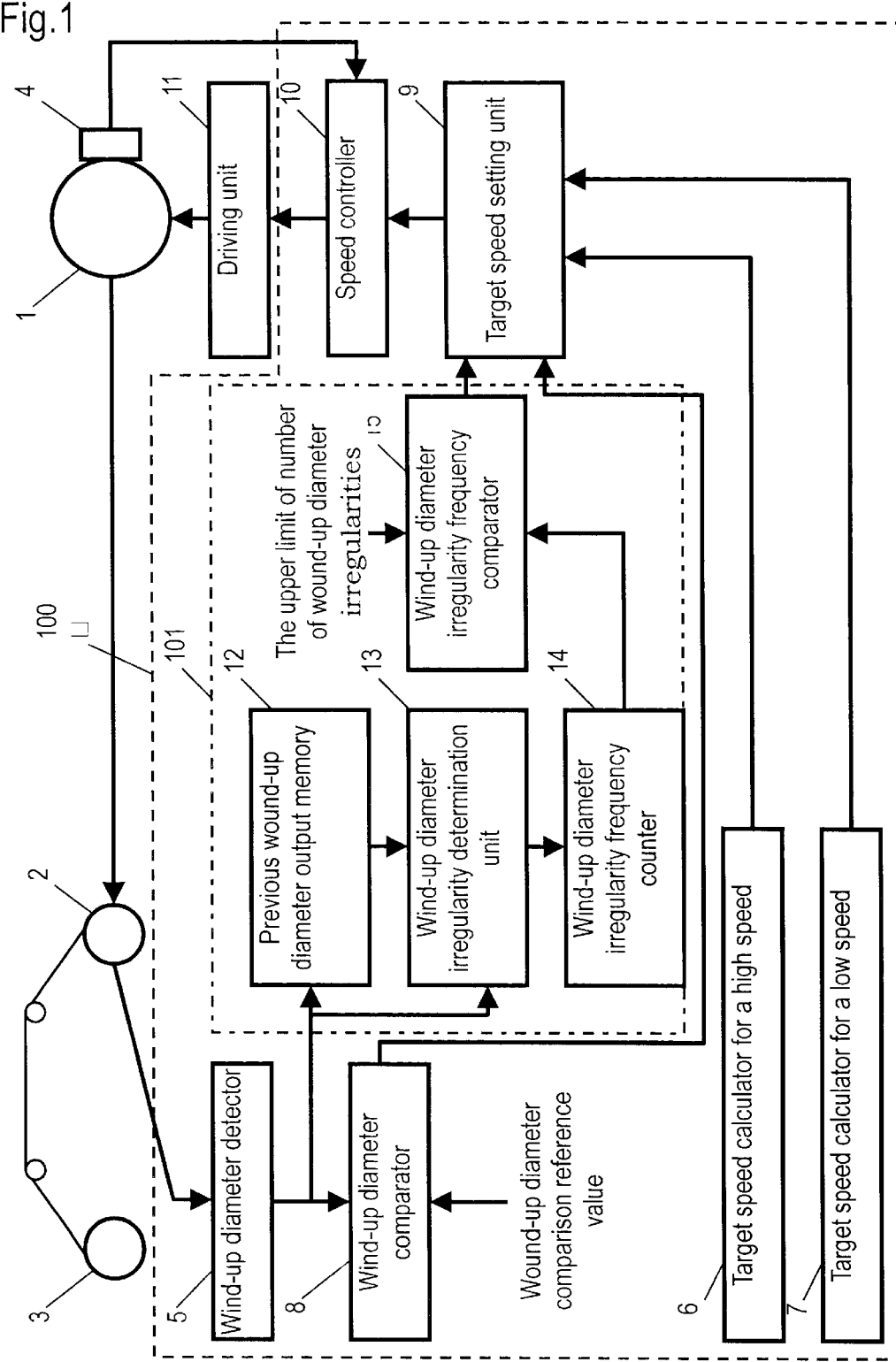
FIG. 1 is a block diagram depicting an architecture of a TMRD of a first exemplary embodiment of the present invention.

FIG. 1 is a block diagram depicting an architecture of a TMRD of a first exemplary embodiment of the present invention.

The TMRD of the first exemplary embodiment of this invention comprises:

a) a motor 1 for moving a tape;

b) a take-up side reel 2, whereto rotation of the motor 1 is transferred via a belt and/or a gear, and whereon one end of a tape-like medium is wound, for moving the tape-like medium by the rotation;

c) a supply side reel 3, whereon the other end of the tape-like medium is wound, for supplying the tape-like medium to the take-up side reel 2, of which rotation moves the tape-like medium;

d) a rotation detector 4 having an MR element, which outputs a frequency signal by detecting polarities (an N pole and an S pole) magnetized at regular intervals around a perimeter of the motor 1, for outputting a signal in frequency proportional to rotating speed of the motor 1;

e) a wound-up diameter detector 5 for outputting a signal corresponding to a wound-up diameter according to a number of rotations of the take-up side reel 2 and the supply side reel 3;

f) a high-speed calculator 6 for producing an output of a target speed in order to bring up rotating speed of the motor 1 to a first speed;

g) a low-speed calculator 7 for producing an output of another target speed in order to slow down the rotating speed of the motor 1 gradually with the lapse of time from the first speed, and bringing it down to a second speed in the end;

h) a wound-up diameter comparator 8 for comparing an output of the wound-up diameter detector 5 with a wound-up diameter comparison reference value pre-established internally, and for outputting a result;

i) a target setting unit 9 for establishing a target speed of the motor 1 based on an output of the wound-up diameter comparator 8 and an output of a wound-up diameter irregularity frequency comparator (hereinafter referred to simply as "irregularity comparator") 15, which will be described later;

j) a speed controller 10 for outputting a rotation dictating signal in order to carry out a speed control in a manner to bring an output of the rotation detector 4 closer to the target speed output by the target setting unit 9;

k) a driving unit 11 for rotating the motor 1 according to the rotation dictating signal output by the speed controller 10;

l) a previous wound-up diameter output memory (hereinafter simply referred to as "memory unit") 12 for temporarily storing a preceding value of an output of the wound-up diameter detector 5 before it is renewed, and outputting the value;

m) a wound-up diameter irregularity determination unit (hereinafter simply referred to as "determination unit") 13 for comparing the output of the wound-up diameter detector 5 with an output of the memory unit 12, and outputting a pulse if the output of the wound-up diameter detector 5 is not greater than the output of the memory unit 12;

n) a wound-up diameter irregularity frequency counter (hereinafter simply referred to as "counter") 14 for counting a number of the pulses output by the determination unit 13, and outputting a result;

o) the irregularity comparator 15 for comparing an output of the counter 14 with an upper limit of number of wound-up diameter irregularities pre-established internally, and outputting a signal signifying an irregular condition if the output of the counter 14 is greater than the upper limit of number of wound-up diameter irregularities; and p) an irregularity detection unit 101 including the memory unit 12, the determination unit 13, the counter 14 and the irregularity comparator 15.

The target setting unit 9 carries out functions of:

setting a target speed in order to slow down rotating speed of the motor 1 gradually with the lapse of time from a target speed for a high speed Vb (i.e. the first speed), and to rotate it eventually at a target speed for a low speed Va (i.e. the second speed), if an output of the wound-up diameter comparator 8 indicates that the output of the wound-up diameter detector 5 is greater than the wound-up diameter comparison reference value; or if an output of the irregularity comparator 15, to be described later, indicates that the output of the counter 14, to be described later, is greater than the upper limit of number of wound-up diameter irregularities; and setting another target speed in order to rotate the motor 1 at the first speed, in all cases other than the above.

In this instance, the take-up side reel 2 and the supply side reel 3 are reversed of their functions in the case of fast-forwarding as opposed to rewinding.

A method used in the wound-up diameter detector 5 for calculating a wound-up diameter will be described now. A length of the tape-like medium wound by one complete rotation of a reel can be obtained with the formula:

$$(V1) \times (T1)$$

An outer perimeter of the reel is given by $2\pi R$ using the number $\pi$, or the ratio of the circumference of a circle to its diameter.

where:

V1 denotes a speed of the tape;

T1 denotes a time required for a take-up side reel to make one complete rotation; and R denotes a winding radius (i.e. a radius from a center of the reel to an outer perimeter of the tape-like medium)

Since the tape-like medium is wound by rotation of the take-up side reel, a length of the tape-like medium wound by one complete rotation of the reel is equal to the circumference of the reel. The wound-up radius R can therefore be obtained with the two figures and the formula:

$$R = (V1) \times (T1)/(2\pi)$$

A slit is provided in one location of the reel in order to detect rotation of the reel. An optical sensor detects rotation of the reel by sensing the slit passing by it. Although what has been described in the above is a method of calculating wound-up diameter from the time required for the reel to make one complete rotation, the wound-up diameter can be obtained from a lapse of time the reel turns for 1/N of a full rotation, if the reel is provided with N number of the slits around it. Or, the same effect is obtainable by using an MR element as in the case of the motor 1 (by contraries, the motor 1 may be provided with a slit to achieve the same function.)

In addition, a method of calculating target speed for a high speed in the high-speed calculator 6 uses the highest speed that the motor 1 is able to rotate, in its calculation of the target speed.

The foregoing TMRD constructed as shown in FIG. 1 operates in a manner, which will be described hereinafter.

When a command is input (not shown in the figure) for the TMRD to rewind the tape-like medium, the speed controller 10 starts the motor 1 via the driving unit 11. The wound-up diameter detector 5 detects a wound-up diameter of the tape-like medium wound on the take-up side reel 2 with the tape in its position at the time. In the case if reproduction, etc. had not been carried out previously, the TMRD starts the reproduction, etc. from that position to detect the wound-up diameter. The determination unit 13 compares the wound-up diameter output by the wound-up diameter detector 5 with the previous wound-up diameter obtained from an output of the memory unit 12 in order to determine whether or not the wound-up diameter output by the wound-up diameter detector 5 has a normal value. As a result of the comparison, the determination unit 13 determines the wound-up diameter output by the wound-up diameter detector 5 as being irregular, and outputs a pulse to the counter 14, if the wound-up diameter is not greater than the previous wound-up diameter. On the other hand, the determination unit 13 determines the wound-up diameter output by the wound-up diameter detector 5 as being normal, and it does not output the pulse to the counter 14, if the wound-up diameter is greater than the previous wound-up diameter.

The irregularity comparator 15 compares a number of output pulses (i.e. a number of irregularities that have occurred in the wound-up diameter) of the determination unit 13 counted by the counter 14 with the upper limit of number of wound-up diameter irregularities pre-established internally. As a result, the irregularity comparator 15 outputs to the target setting unit 9 a signal signifying that the output of the wound-up diameter detector 5 is in error, if the number counted by the counter 14 is greater than the upper limit of number of wound-up diameter irregularities.

On the other hand, the irregularity comparator 15 does not output to the target setting unit 9 the signal signifying that the output of the wound-up diameter detector 5 is irregular, if the number counted by the counter 14 is not greater than the upper limit of number of wound-up diameter irregularities. The target setting unit 9 selects either one of outputs of the high-speed calculator 6 and the low-speed calculator 7 based on the wound-up diameter output by the wound-up diameter detector 5 and a result of irregularity determination of wound-up diameter output by the irregularity comparator 15, and outputs it to the speed controller 10 as a target speed. In other words, the irregularity comparator 15 compares the number of irregularities in the wound-up diameter output by the counter 14 with the upper limit of number of wound-up diameter irregularities pre-established internally, if the wound-up diameter output by the wound-up diameter detector 5 is not greater than the wound-up diameter comparison reference value. As a result, if the number of irregularities in the wound-up diameter is not greater than the upper limit of number of wound-up diameter irregularities, then the target setting unit 9 selects the output of the high-speed calculator 6 according to a control signal, i.e. an output, of the irregularity comparator 15, and outputs it as a target speed to the speed controller 10.

On the other hand, the target setting unit 9 selects the output of the low-speed calculator 7 according to the control signal, or the output, of the irregularity comparator 15, if the number of irregularities in the wound-up diameter is greater than the upper limit of number of wound-up diameter irregularities. As a result, the target setting unit 9 outputs to the speed controller 10 a target speed of the motor 1, which varies from the output of the high-speed calculator 6 to eventually the output of the low-speed calculator 7, in such a manner that the motor 1 slows down its rotating speed gradually depending upon the lapse of time.

On the other hand, the target setting unit 9 selects the output of the low-speed calculator 7 according to a control signal, or an output, of the wound-up diameter comparator 8, if the wound-up diameter output by the wound-up diameter detector 5 is greater than the wound-up diameter comparison reference value. As a result, the target setting unit 9 outputs to the speed controller 10 a target speed of the motor 1, which varies from the output of the high-speed calculator 6 to eventually the output of the low-speed calculator 7, in such a manner that the motor 1 slows down its rotating speed gradually depending upon the lapse of time.

Based on a rotating speed of the motor 1 obtained from a frequency signal output by the rotation detector 4 as the motor 1 rotates, and the target speed output by the target setting unit 9, the speed controller 10 outputs a rotation dictating signal to the driving unit 11 in order to rotate the motor 1 at a speed near to the target speed. The driving unit 11 drives the motor 1 to rotate according to the rotation dictating signal output by the speed controller 10. The take-up side reel 2, to which rotation of the motor 1 is transferred, winds the tape-like medium from the supply side reel 3.

Figure 3:
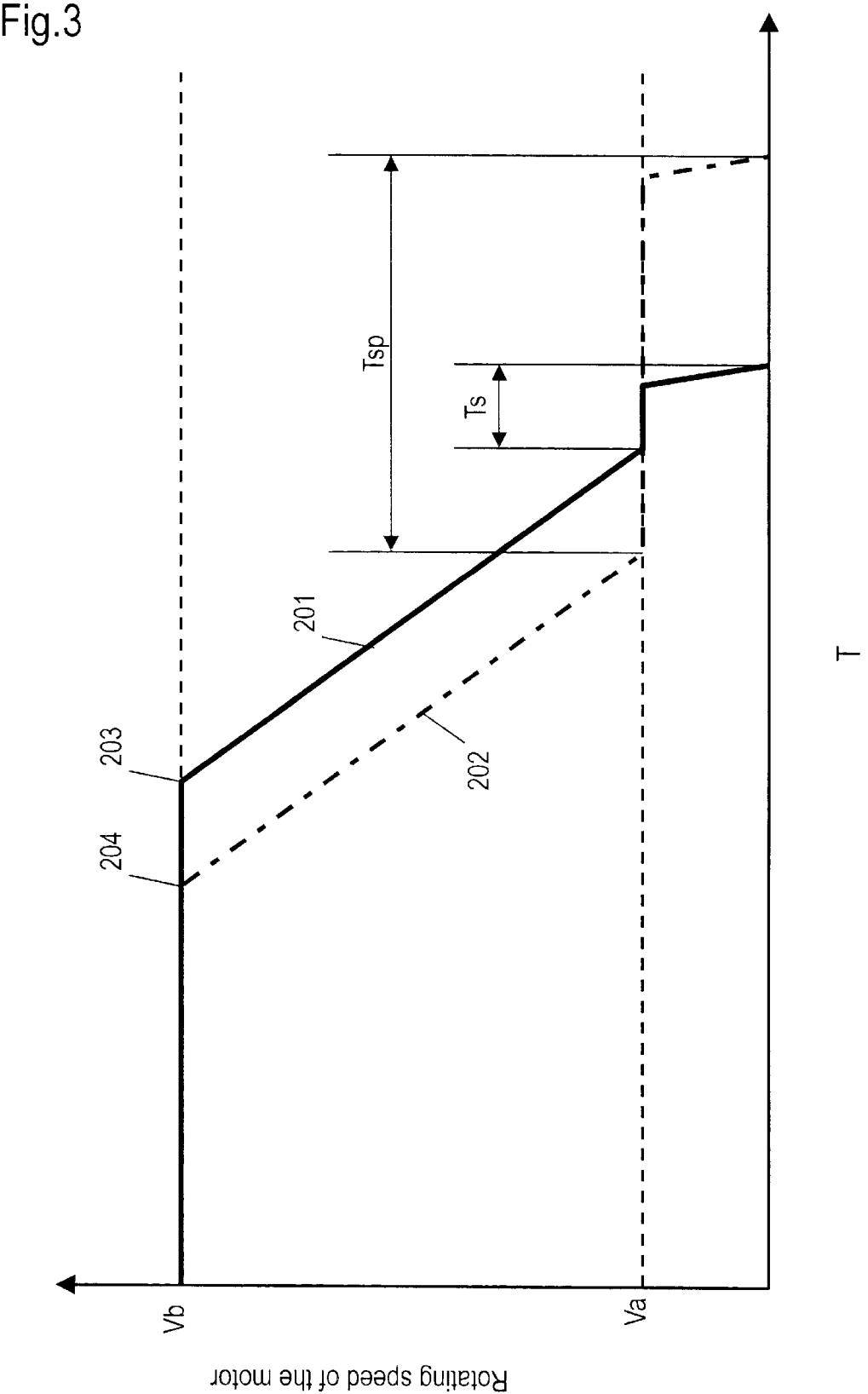
FIG. 3 is a characteristic chart depicting a slowdown of rotating speed of the motor 1 of this invention.
Figure 4:
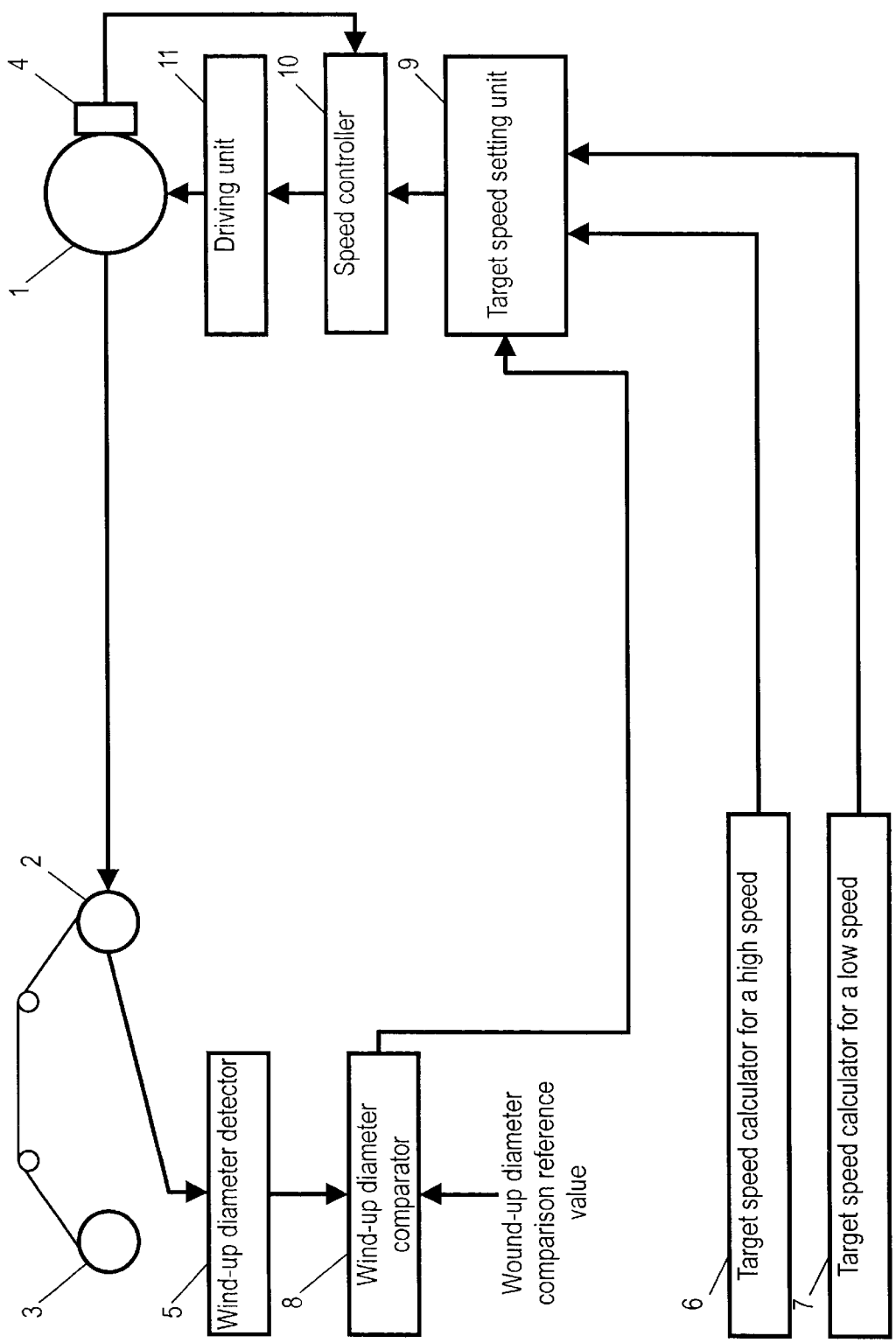
FIG. 4 is a block diagram depicting an architecture of a TMRD of the prior art.
Figure 5:
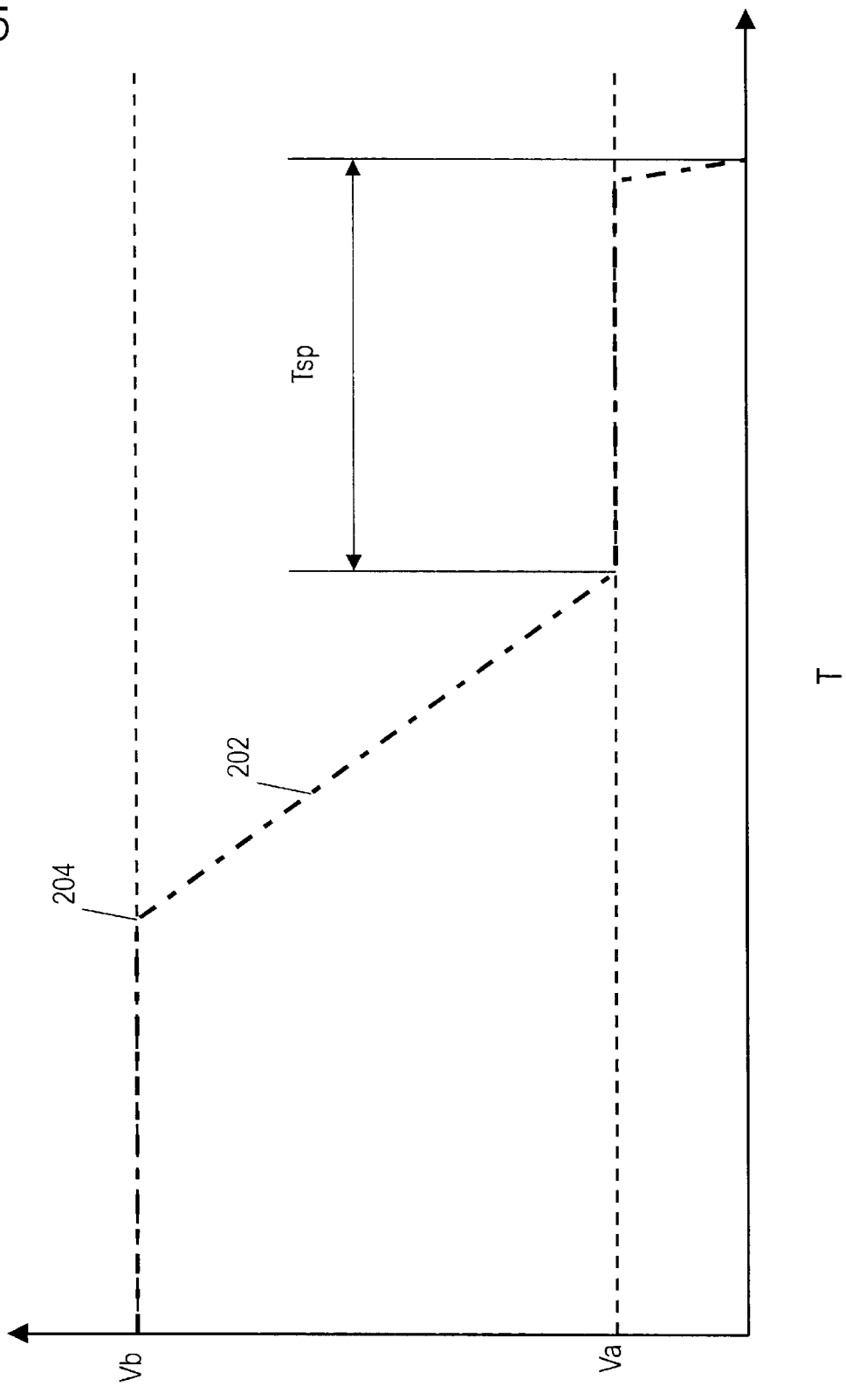
FIG. 5 is a characteristic chart depicting a slowdown of rotating speed of the motor 1 of the prior art.

Referring now to FIG. 3, described hereinafter is a relation between rotating speed of the motor 1 and lapse of time during a reduction in speed of the motor 1. In FIG. 3, the axis of ordinates and the axis of abscissas respectively represent rotating speed of the motor 1 and lapse of time T during a reduction in speed of the motor 1. The target speed for a low speed (second speed) is represented by an alphabetic symbol Va, and the target speed for a high speed (first speed) is represented by an alphabetic symbol Vb. FIG. 3 is a characteristic chart showing a slowdown of rotating speed of the motor 1 near a tail end during fast-forwarding (or, near a leading end during rewinding). A slowdown characteristic near the tail end during fast-forwarding (or, near the leading end during rewinding) in the TMRD of this invention is shown by a solid line 201. A point marked by a reference numeral 203 indicates a starting point of the speed reduction that the TMRD of this invention commences based on the wound-up diameter comparison reference value. FIG. 3 shows a comparison in characteristic of this invention with the prior art device for reference purpose. In the TMRD of the prior art, a starting point 204 of the speed reduction could not be set at a marginal point near the leading end or the tail end of the tape, taking into consideration that the wound-up diameter detector 5 produces a detecting error due to a change of load, etc. on the tape near the leading end and the tail end. As a result, the TMRD of the prior art has had a long period of time Tsp after the wound-up diameter exceeds the wound-up diameter comparison reference value, and rotating speed of the motor 1 is slowed down gradually from the target speed Vb of high speed and reaches in the end at the target speed Va of low speed. Because of the above reason, the fast-forward time and the rewind time could not be reduced with the TMRD of the prior art. However, the present invention provides an addition of protective mechanism for reducing the rotating speed of the motor 1 gradually from the target speed Vb of high speed and settling it eventually at the target speed Va of low speed, by detecting an error, if there is any, produced by the wound-up diameter detector 5 due to a change of load, etc. on the tape near its leading end and the tail end. Therefore, the TMRD of this invention allows the wound-up diameter comparison reference value to be set in a such way that the starting point 203 of the speed reduction is closer to a marginal point of the leading end and the tail end, as compared to the TMRD of the prior art. Consequently, the invention is able to minimize a time Ts, in which the motor 1 rotates at the target speed Va of low speed, thereby realizing a reduction in running time during fast-forwarding and rewinding.

Figure 2:
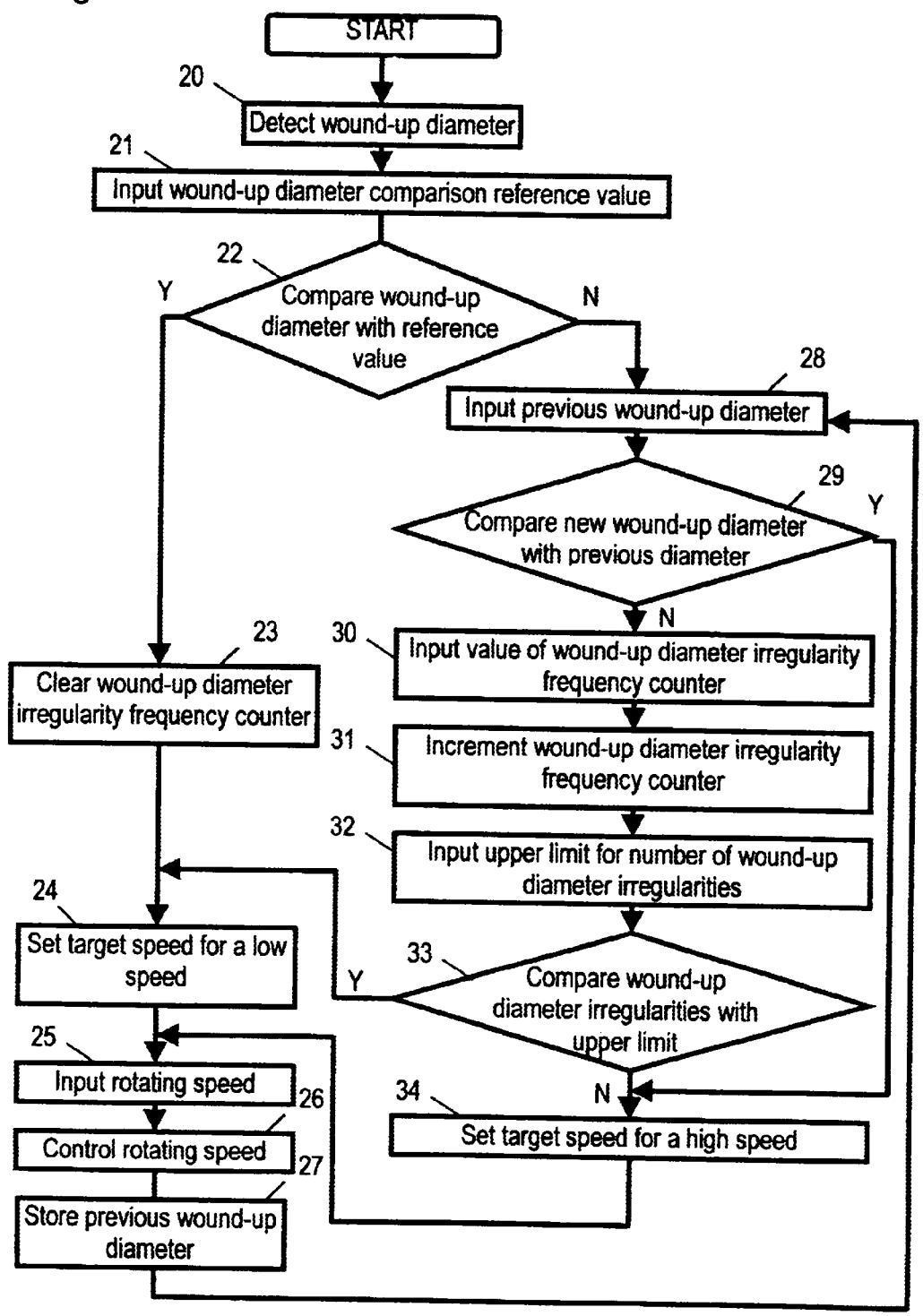
FIG. 2 is a flowchart depicting a software program of the TMRD of the first exemplary embodiment of the invention.

In the present exemplary embodiment, functions of a portion surrounded by a broken line shown by a reference numeral 100 in FIG. 1 may be materialized with a software program within a microcomputer in the same way. Referring now to FIG. 2, the software program will be described hereinafter. FIG. 2 is a flowchart depicting the software program of the TMRD of the first exemplary embodiment of the invention.

A wound-up diameter detecting step 20 (hereinafter simply referred to as "step 20") is for detecting a wound-up diameter of the tape-like medium wound on the take-up side reel 2 from periods of time taken for the take-up side reel 2 and the supply side reel 3 to make a full rotation while the tape-like medium is being run;

A wound-up diameter comparison reference value input step 21 (hereinafter simply referred to as "step 21") is for inputting a wound-up diameter comparison reference value;

A wound-up diameter comparison step 22 (hereinafter simply referred to as "step 22") is for comparing the wound-up diameter comparison reference value input in the step 21 and the wound-up diameter obtained in the step 20, and determining whether or not the wound-up diameter is greater than the wound-up diameter is comparison reference value;

A wound-up diameter counter clearing (initializing) step 23 (hereinafter simply referred to as "step 23") is for clearing the wound-up diameter irregularity frequency counter;

A low target speed setting step 24 (hereinafter simply referred to as "step 24") is for setting a target speed in a manner that rotating speed of the motor 1 is reduced gradually with the lapse of time from the first speed, and eventually settled at the target speed Va for a low speed, or the second speed;

A rotating speed inputting step 25 (hereinafter simply referred to as "step 25") is for inputting a rotating speed detected by the rotation detector 4;

A speed controlling step 26 (hereinafter simply referred to as "step 26") is for outputting a rotation command based on the rotating speed and the target speed, in order to cause the motor 1 to rotate at the target speed;

A previous wound-up diameter storing step 27 (hereinafter simply referred to as "step 27") is for temporarily storing the wound-up diameter of the tape-like medium wound on the take-up side reel 2 and detected in the step 20, in order to compare it as the previous wound-up diameter at the succeeding detection of wound-up diameter;

A previous wound-up diameter inputting step 28 (hereinafter simply referred to as "step 28") is for inputting the previous wound-up diameter stored temporarily in the step 27;

A wound-up diameter comparison step 29 (hereinafter simply referred to as "step 29") is for determining whether or not the wound-up diameter obtained in the step 20 is greater than the previous wound-up diameter input in the step 28;

A wound-up diameter irregularity frequency counter value inputting step 30 (hereinafter simply referred to as "step 30") is for inputting a value of the wound-up diameter irregularity frequency counter, which represents a number of irregularities up to the preceeding count, as a first step for counting a total number of irregularities, if the wound-up diameter is judged not greater than the previous wound-up diameter in the step 29, and is therefore determined to be a countable irregularity;

A wound-up diameter irregularity frequency counter incrementing step 31 (hereinafter simply referred to as "step 31") is for adding 1, i.e. a number of irregularity occurred this time, to the latest number of irregularities input in the step 30, and store the sum again into the wound-up diameter irregularity frequency counter;

A wound-up diameter irregularity frequency upper-limit value inputting step 32 (hereinafter simply referred to as "step 32") is for inputting an upper limit of number of wound-up diameter irregularities;

A wound-up diameter irregularity frequency comparison step 33 (hereinafter simply referred to as "step 33") is for comparing the latest number of wound-up diameter irregularities, in which 1 has been added in the step 31, and the upper limit of number of wound-up diameter irregularities input in the step 32, and determining whether or not the number of wound-up diameter irregularities is greater than the upper limit of number of wound-up diameter irregularities; and A high target speed setting step 34 (hereinafter simply referred to as "step 34") is for setting a target speed for the motor 1 to rotate at the target speed Vb of high speed, which is the first speed.

The foregoing software program of the TMRD shown in FIG. 2 functions in a manner which will be described hereinafter.

In the step 20, the wound-up diameter detector 5 determines a wound-up diameter of the tape-like medium wound on the take-up side reel 2 by way of detecting a period of time taken for the take-up side reel 2 and the supply side reel 3 to make a full rotation while the tape-like medium is being run.

In the step 21, the wound-up diameter comparison reference value is input to the wound-up diameter comparator 8.

If the wound-up diameter is greater than the wound-up diameter comparison reference value, a value representing the number of irregularities that have occurred in the wound-up diameter is cleared (initialized) in the step 23 according to a process selected in the step 22. The program then moves into the step 24 after clearing the value of the counter. In the step 24, a target speed is set for the motor 1 to rotate in a manner that its rotating speed is reduced gradually with the lapse of time from the first speed, and settled eventually at the target speed Va for a low speed, which is the second speed.

On the other hand, if the wound-up diameter is not greater than the wound-up diameter comparison reference value in the step 22, the following steps are taken in order to select either one of the step 24 and the step 34.

First, a value of the previous wound-up diameter stored temporarily in the step 27 is input to the determination unit 13 in the step 28. The determination unit 13 determines in the step 29 as to whether or not the wound-up diameter obtained in the step 20 (latest wound-up diameter) is greater than the previous wound-up diameter input in the step 28. If, as a result, the wound-up diameter is greater than the previous wound-up diameter, the determination unit 13 judges it normal, and selects the step 34 in the step 29, and sets a target speed for the motor 1 in a manner that its rotating speed reaches the target speed Vb for a high speed, which is the first speed.

If, on the other hand, the wound-up diameter is not greater than the previous wound-up diameter, the determination unit 13 judges it a countable irregularity. Consequently, the following steps are further taken in order to select either one of the step 24 and the step 34. The reason is as follows. The take-up side reel 2 winds the tape-like medium, as the motor 1 rotates. The wound-up diameter of the take-up reel 2 only increases when winding. Therefore, the determination unit 13 can judge that there has been a countable irregularity in the wound-up diameter detected previously or at this time, if the detected wound-up diameter becomes smaller.

In the step 30, a value of the counter 14 stored in the microcomputer as a number up to the preceeding count is input. In the step 31, a count of 1 is added as a number of irregularity occurred this time to the previous number of wound-up diameter irregularities input in the step 30, and store the sum again in the wound-up diameter irregularity frequency counter 14. In the step 32, an upper limit of number of wound-up diameter irregularities is input for a comparison purpose with the number of countable irregularities that have occurred, as judged in the step 29. In the step 33, a determination is made for the wound-up diameter irregularities, if the number of wound-up diameter irregularities is greater than the upper limit of number of wound-up diameter irregularities. The step 24 is then selected in the step 33. Consequently, in the step 24, a target speed is set for the motor 1 to rotate in a manner that its rotating speed is reduced gradually with the lapse of time from the first speed, and eventually settled at the target speed Va for a low speed, which is the second speed.

On the other hand, the step 34 is selected in the step 33, if the number of wound-up diameter irregularities is not greater than the upper limit of number of wound-up diameter irregularities. Thus, a target speed is set in the step 34 for the motor 1 in a manner that its rotating speed reaches the target speed Vb for a high speed, which is the first speed.

In the step 25, the rotation detector 4 detects and inputs a rotating speed. Then, a rotation dictating signal is output in the step 26 based on the rotating speed and the target speed in order to drive the motor 1 to run at the target speed. In the step 27, the wound-up diameter of the tape-like medium wound on the take-up side reel 2 and detected in the step 20 is stored temporarily for use as the previous wound-up diameter, when making another comparison with a wound-up diameter to be detected successively.

The program continues again from the step 20 to set a new target speed by selecting either of the step 24 and the step 34 after comparing a newly detected wound-up diameter with the preceeding value, to input a rotating speed in the step 25, and to output a new rotation command in the step 26.

As has been described, the first exemplary embodiment provides the TMRD with an additional protective mechanism for setting a rotating speed of the motor 1 in a manner that it is forcibly reduced gradually with the lapse of time from the first speed, and eventually settled at the second speed, if an output of the wound-up diameter detector 5 fluctuates with an error due to variation of load on the tape and so on. This addition of the protective mechanism enables the TMRD to accurately detect irregular conditions with no delay. Hence, the wound-up diameter comparison reference value can be set at a higher level. A period of time, during which the motor 1 rotates at the second target speed Va of low speed, can be minimized by setting the starting point of speed reduction to a marginal point near the leading end when rewinding (or, another marginal point near the tail end when fast-forwarding). Accordingly, the first exemplary embodiment enables the TMRD to reduce the time required for rewinding and fast-forwarding.

As described above, the present invention allows a setting of the wound-up diameter comparison reference value at a higher level so as to shift the starting point of speed reduction to the marginal point near the leading end when rewinding, and the other marginal point near the tail end when fast-forwarding, since a target speed for the motor to rotate is switched from the target speed for a high-speed running to the target speed for a low-speed running by an output of the irregularity detection unit. As a result, the time in which the motor runs at a low speed, i.e. the second speed, can be minimized. Hence, the TMRD can shorten the time needed for fast-forwarding and rewinding.

In addition, the TMRD reduces the target speed of the motor with the lapse of time from the first speed and eventually settles at the second speed, even if a detected result of wound-up diameter is in error, by way of determining it as irregular. The present invention can therefore provide a superior advantage, enabling the TMRD capable of preventing the tape from being damaged due to running up to the leading end or the tail end at a high speed.

What is claimed is:

1. A tape-like medium running device comprising:
   (a) a motor;
   (b) a rotation detector for detecting a signal in a frequency proportional to a rotating speed of said motor;
   (c) a take-up side reel, whereon one end of a tape-like medium is wound, for rotating in a synchronized motion with rotation of said motor;
   (d) a supply side reel, whereon the other end of said tape-like medium is wound;
   (e) a wound-up diameter detector for detecting a diameter of said tape-like medium wound on said take-up side reel;
   (f) a target speed calculator for a high speed for setting a rotating speed of said motor at a first speed;
   (g) a target speed calculator for a low speed for slowing down the rotating speed of said motor gradually with the lapse of time from said first speed, and settling it down at a second speed in the end;
   (h) a wound-up diameter comparator for comparing said detected wound-up diameter with a wound-up diameter comparison reference value pre-established therein;
   (i) an irregularity detection unit for detecting an irregular condition based upon said detected wound-up diameter;
   (j) a target speed setting unit for setting a target speed for said motor according to a detected result of said irregularity detection unit;
   (k) a speed controller for outputting a rotation dictating signal base on said detected wound-up diameter and said set target speed; and
   (l) a driving unit for driving said motor to rotate according to said rotation dictating signal.

2. The tape-like medium running device according to claim 1, wherein said target speed setting unit carries out functions of:

selecting an output of said target speed calculator for a low speed, if a detected result of said irregularity detection unit indicates an irregular condition, or if said wound-up diameter comparator indicates that a detected result of said wound-up diameter detector is greater than said wound-up diameter comparison reference value; and selecting an output of said target speed calculator for a high speed in all cases other than the aforesaid case.

3. The tape-like medium running device according to claim 1, wherein said irregularity detection unit comprises:
   (a) a previous wound-up diameter output memory for temporarily storing an output of said wound-up diameter detector as a preceding value of wound-up diameter, before said output is renewed, and outputting said value;

(b) a wound-up diameter irregularity determination unit for comparing and determining an output of said wound-up diameter detector with an output of said previous wound-up diameter output memory;

(c) a wound-up diameter irregularity frequency counter for counting a number of pulses output by said wound-up diameter irregularity determination unit as a result of determination by said determination unit; and (d) a wound-up diameter irregularity frequency comparator for comparing an output of said wound-up diameter irregularity frequency counter with an upper limit of number of wound-up diameter irregularities pre-established therein.

4. The tape-like medium running device according to claim 3, wherein said wound-up diameter irregularity determination unit for comparing an output of said wound-up diameter detector with an output of said previous wound-up diameter output memory further carries out functions of:

outputting no pulse if the output of said wound-up diameter detector is greater than the output of said previous wound-up diameter output memory; and outputting a pulse if the output of said wound-up diameter detector is not greater than the output of said previous wound-up diameter output memory.

5. The tape-like medium running device according to claim 3, wherein said wound-up diameter irregularity frequency comparator determines that the output of said wound-up diameter irregularity frequency counter shows:

an irregular condition, if said output is greater than said upper limit of number of wound-up diameter irregularities; and not an irregular condition, if said output is not greater than said upper limit.

* * * * *